United States Patent [19]

Falconer

[11] 4,280,328
[45] Jul. 28, 1981

[54] UTILIZATION OF SOLAR ENERGY

[76] Inventor: Claude J. Falconer, 19349 Riverside Dr., Sonoma, Calif. 95476

[21] Appl. No.: 79,956

[22] Filed: Sep. 28, 1979

[51] Int. Cl.³ ............................................. F03G 7/02
[52] U.S. Cl. ..................................... 60/641 A; 60/650; 60/675; 60/682; 60/715; 126/433; 126/435; 126/443; 290/1 R; 290/52
[58] Field of Search ................. 60/641, 650, 675, 682, 60/698, 715; 126/433, 435, 443; 203/DIG. 20; 290/1 R, 4 R, 4 A, 52

[56] References Cited

U.S. PATENT DOCUMENTS

| 2,636,129 | 4/1953 | Agnew | 203/DIG. 20 |
| 2,942,411 | 6/1960 | Hutchings | 126/435 X |
| 3,755,076 | 8/1973 | Lindsley | 290/52 X |
| 3,892,433 | 7/1975 | Blake | 290/52 |
| 4,047,385 | 9/1977 | Brinjevec | 60/641 |
| 4,099,381 | 7/1978 | Rappoport | 60/641 |
| 4,103,493 | 8/1978 | Schoenfelder | 60/641 |
| 4,171,617 | 10/1979 | Sakamoto | 60/641 |
| 4,172,442 | 10/1979 | Boblitz | 126/435 X |
| 4,189,922 | 2/1980 | Bellofatto | 60/641 |
| 4,198,956 | 4/1980 | Soleav | 126/450 X |

Primary Examiner—Robert G. Nilson
Attorney, Agent, or Firm—Robert H. Eckhoff

[57] ABSTRACT

Solar energy is utilized to convert water into steam for use in driving a turbine which, in turn, is used to generate electricity. At the same time air in a solar panel is utilized to drive another turbine which in turn generates electricity. The water recovered by condensation of the steam is permitted to drop from the elevation at which it is accumulated and that water is used to drive another turbine which in turn generates further electricity.

1 Claim, 4 Drawing Figures

UTILIZATION OF SOLAR ENERGY

BACKGROUND OF THE INVENTION

With the current energy shortage, attention has been given to the use of solar energy because this does not diminish any of the natural energy sources such as coal, natural gas, oil and the like.

SUMMARY OF THE INVENTION

In general it is the broad object of the present invention to provide a novel system in which various commonly known mechanical devices are utilized to generate power by the conversion of water to steam and by the heating of air.

DESCRIPTION OF THE PREFERRED EMBODIMENT

The present preferred embodiment of the invention includes a solar panel generally indicated at 6 and which comprises an elongated casing provided at an angle to the horizontal and having a transparent front cover 7 in which solar energy is transmitted to heat air admitted through a lower opening 8 for release through an upper exit 9.

Figure 3:
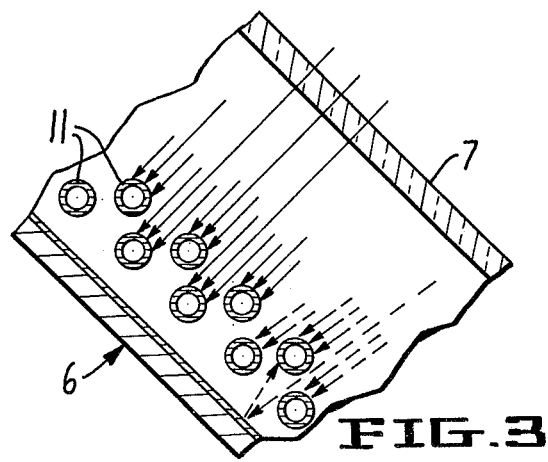
FIG. 3 is a cross section of the solar panel showing the arrangement of the elements utilized to convert water to steam.

Inside the solar panel are a plurality of tubular elements 11 arranged horizontally to receive solar energy as is shown in FIG. 3. Each of the tubular elements 11 is suitably coated to provide for a maximum reception of the solar energy. Water is admitted by a pump 12 from a reservoir 13 to the lowermost element 11 to rise through the interconnected tubes to exit finally as steam through outlet pipe 14. Steam is admitted to turbine 16 which in turn drives a generator 17.

Steam issuing from the turbine is admitted to cooling tower 18 through pipe 19 for condensation and returns to the reservoir 21. That reservoir is at a substantial elevation and release of the water in the reservoir through line 22 to the hydroturbine 23 permits the latter to operate a generator 24 which in turn provides power for transmission to electrical control element 26.

Air is forced into the elongated casing by blower 15 through inlet 20. The air is heated in the solar panel 6. The hot air released through outlet 9 to line 27 drives another turbine 28 which in turn operates another generator 29 for delivery of power to the electrical control 26.

Control 26 can provide power to drive a motor 31 which in turn operates flywheel 32 providing an input to generator 33 which delivers power to transformer 34 for suitable delivery to power lines 36. Power from electrical control 26 can also be delivered through lines 37 to the transformer if desired.

Figure 4:
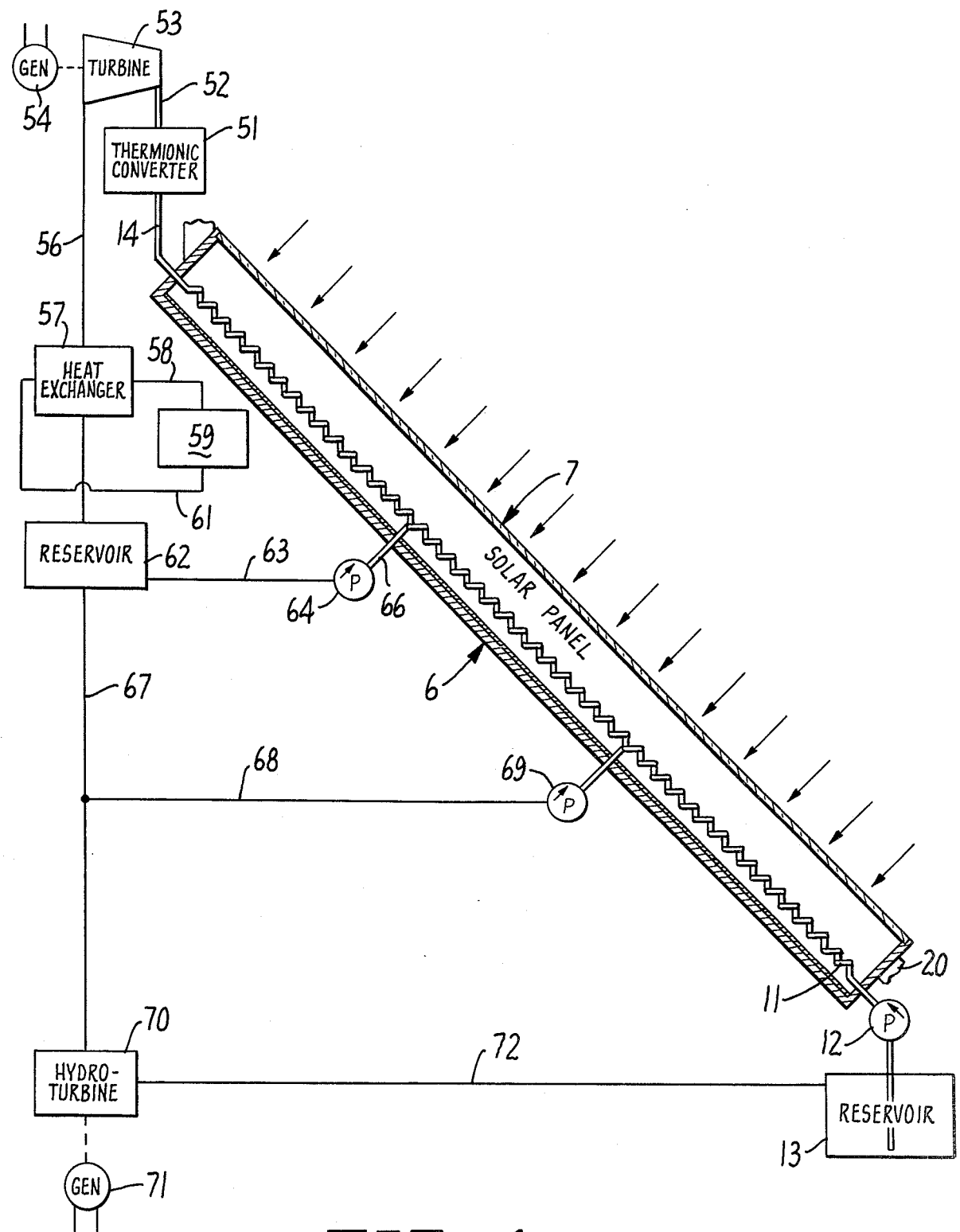
FIG. 4 is a schematic side elevation of another arrangement for utilizing solar energy with great effectiveness.

In that form of the device shown in FIG. 4, steam issuing through line 14 is passed through a thermionic converter generally indicated at 51. Thermionic converters are well known and reference can be made to various publications including that which appears beginning at page 72 in "Popular Science" for June 1979 for details of the construction of such a converter.

Energy from the thermionic converter is passed through line 52 to a turbine 53 which in turn generates electricity by means of a generator 54. Steam exhausted from the turbine 53 is sent through line 56 to a heat exchanger 57. In the heat exchanger a suitable fluid is circulated through line 58 through a second thermionic converter or an air conditioner 59, the fluid being recirculated over the circuit provided by line 61.

Water issuing from the heat exchanger is stored in a reservoir 62 from which water is diverted through line 63 to a pump 64 for injection through line 66 into one or more of the tubular elements 11 to generate more steam. Water injection is also provided from line 67 from the reservoir through line 68 and pump 69 for injection into a lower portion of the tubular elements 11. The remaining water, due to its hydrostatic head, is utilized in hydroturbine 70 for operating generator 71. The water from the hydroturbine is returned through line 72 to reservoir 13.

Figure 1:
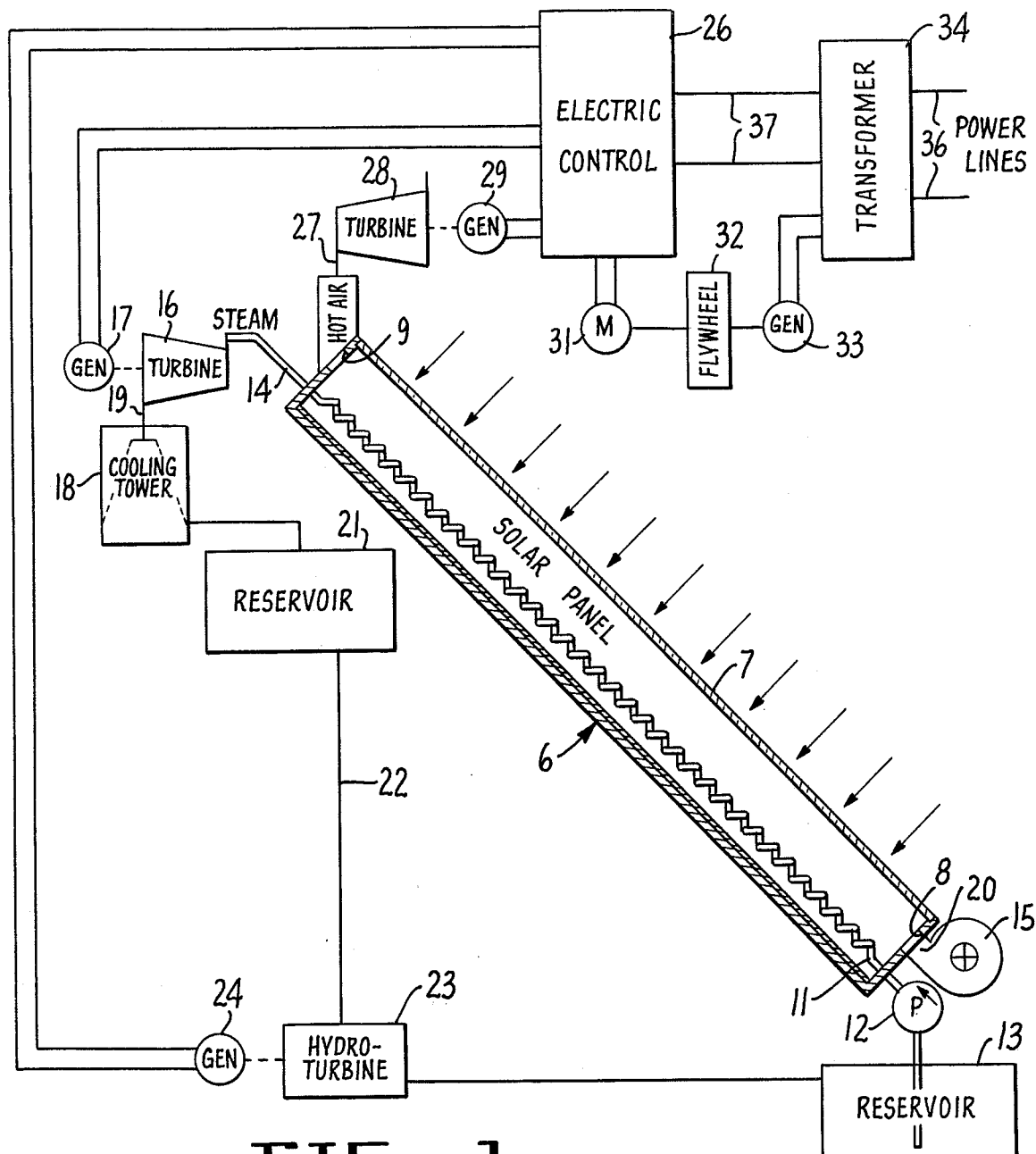
FIG. 1 is a schematic view illustrating the apparatus assembly utilized.
Figure 2:
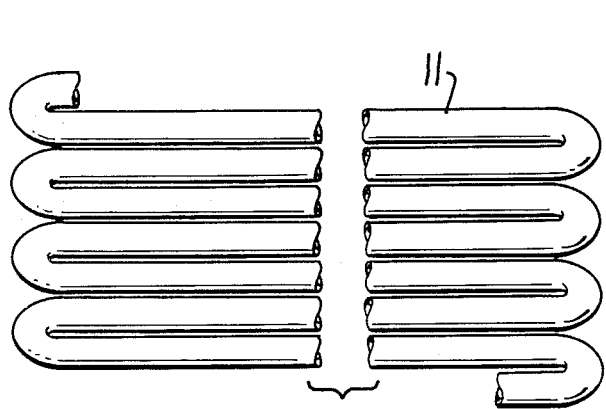
FIG. 2 is a fragmentary plan view of the heating elements provided in the solar panel.

While in FIGS. 1 and 4 I have shown the solar panel 6 diagrammatically, it is to be understood that this is placed at a suitable angular elevation in a location where it will receive the full benefit of solar energy from the sun's rays. The length of the panel 6 varies with the size of the installation and the amount of power desired. The solar panel may be of relatively short length, 15 or 20 feet, or it can be several hundred feet and can extend laterally for a goodly distance so that the power generated is substantial.

I claim:

1. A solar energy device comprising a casing inclined at an angle to the horizontal and having an open front to receive solar energy, the casing having an air inlet at its lower end and an air outlet at its upper end, a series of energy receiving tubular conduits arranged horizontally in the casing and extending from the bottom to the top of the casing, means for supplying water to an inlet to the conduit for heating by solar engery, an outlet at the top of the casing for release of steam created by the heating of the water in the conduits, and a turbine for utilizing the steam and a turbine for utilizing the heated air released through the casing outlet.

* * * * *